United States Patent [19]

Accolla et al.

[11] Patent Number: 5,600,304
[45] Date of Patent: Feb. 4, 1997

[54] EAS SYSTEM WITH COMMON CONTROL STATION FOR DIFFERENT PERSONALITY LOCAL STATIONS

[75] Inventors: William R. Accolla, Loxahatchee; Fadi E. Ayoub, Deerfield Beach; Brent Balch, Ft. Lauderdale, all of Fla.

[73] Assignee: Sensormatic Electronics Corporation, Boca Raton, Fla.

[21] Appl. No.: 556,765

[22] Filed: Nov. 2, 1995

[51] Int. Cl.$^6$ ................................................ G08B 13/187
[52] U.S. Cl. .................... 340/572; 340/551; 364/221.6; 364/227.3; 395/228
[58] Field of Search .................................... 340/572, 551; 364/221.6, 221.1, 227.3, 403, 401 R

[56] References Cited

U.S. PATENT DOCUMENTS

| | | | |
|---|---|---|---|
| 4,787,028 | 11/1988 | Finfrock et al. | 364/200 |
| 5,392,028 | 2/1995 | Pichl | 340/572 |
| 5,457,784 | 10/1995 | Wells et al. | 364/221.1 |
| 5,504,687 | 4/1996 | Wolf | 364/401 R |

*Primary Examiner*—Glen Swann
*Attorney, Agent, or Firm*—Robin, Blecker, Daley & Driscoll

[57] ABSTRACT

An EAS central station has a number of input/output ports each for interfacing with a different personality local station. Hardware equipment and software programming of the central station have parts associated with the different personality local stations and a central processing unit selects the part of the hardware equipment and software programming associated with a local station.

15 Claims, 3 Drawing Sheets

EAS SYSTEM WITH COMMON CONTROL STATION FOR DIFFERENT PERSONALITY LOCAL STATIONS

BACKGROUND OF THE INVENTION

This invention relates to electronic article surveillance ("EAS") systems and, in particular, to EAS systems having a central control station and multiple local stations.

In recently developed EAS systems, a central control station has been used to control the operation of several local stations. Each local station has associated with it transmitter antenna assemblies and receiver antenna assemblies (also referred to as "detection units") which supply signals to and receive signals from associated interrogation zones.

The central control station includes equipment for developing drive signals for driving the transmitter antenna assemblies of the different local stations. It also includes equipment for interfacing with and processing the signals received from the receiver antenna assemblies of the different local stations. The latter processing includes processing the received signals to make EAS tag determinations and establish alarm conditions.

In the EAS systems developed to date, a central control station can only control local stations having the same personality. The personality of a local station is dictated by the physical structure and/or functions performed by the station and may include the following: the physical configuration of the associated transmitter and receiver antenna assemblies; the communication method or protocol used with the local station; the gain adjustment, tag detection parameter adjustment and receiver antenna phasing, all made based on noise, used with the local station; the alarming control used with the local station; and the accessory equipment control (e.g., EAS tag deactivator control, user management interface control) used with the local station.

The different personalities of local stations in use to date have arisen as a result of the need for EAS systems to satisfy different markets or applications. Examples of local stations having different personalities are those adapted for underfloor, overhead, entrance, exit and point-of-sale applications, respectively. In each of these types of stations, different associated transmitter and receiver antenna assemblies are used, which accounts, in part, for the differences in personality. These stations may also require different communication protocols, different receiver gains, different tag detection parameters, as well as different receiver antenna phasing, all of which account for other differences in personality.

As above-mentioned, central control stations in use today can only accommodate local stations having the same personality. This means that in a location with different personality local stations, multiple central control stations must be used. This adds to the expense and complexity of the EAS system.

It is, therefore, an object of the present invention to provide an improved EAS system.

It is a further object of the present invention to provide an EAS system in which different personality local stations can be used in a less complex and cost effective manner.

SUMMARY OF THE INVENTION

In accordance with the principles of the present invention, the above and other objectives are realized in a central control station having one or more ports each for interfacing with a local station. The central control station also includes software programming and hardware means having different parts each associated with controlling a different one of a number of different personality local stations. A central processing unit controls and coordinates the operation of the software programming and hardware means so that a given local station interfaced with a given port is controlled based on the parts of the software programming and hardware means associated with the given local station. The central control station is thus able to efficiently and cost effectively provide control of different personality local stations.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
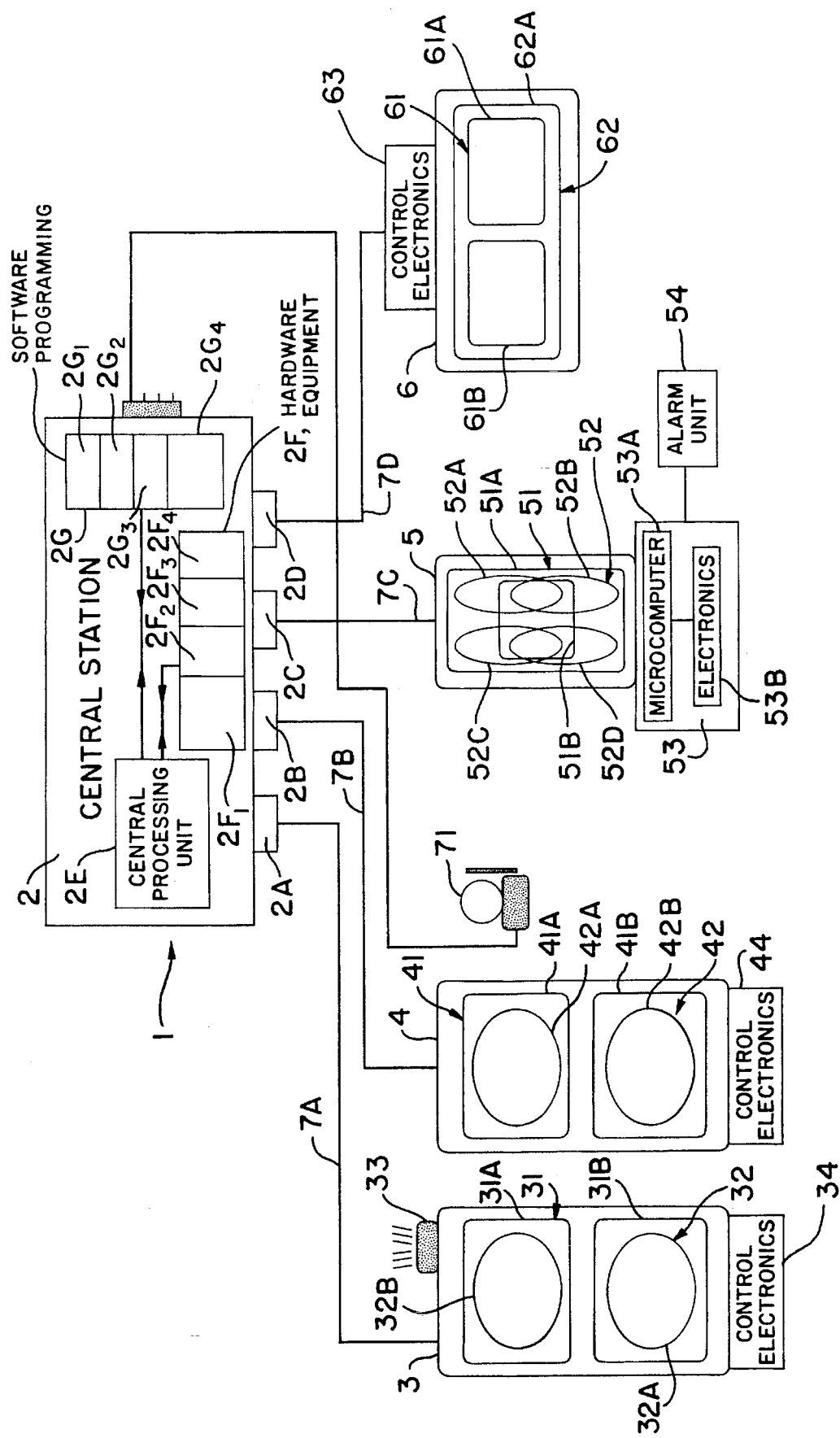
FIG. 1 is a block diagram of an EAS system including a central control station in accordance with the principles of the present invention.

FIG. 1 illustrates an EAS system 1 including a central control station 2 in accordance with the principles of the present invention. The EAS system also includes a plurality of local stations 3, 4, 5 and 6 each having a different personality.

In particular, the local station 3 has associated with it a transmitter coil assembly 31 comprising planar rectangular coils 31A, 31B. Also associated with the local station 3 are planar elliptical receiver coils 32A, 32B of a receiver assembly 32. The local station 3 additionally includes control electronics 34 and a local alarm 33. The alarm 33 is used to sound an alarm condition based on an EAS tag being detected in the interrogation zone being monitored by the local station.

The second local station 4 also includes control electronics 44, an associated transmitter coil assembly 41 comprising planar rectangular coils 41A, 41B and an associated receiver coil assembly 42 comprising planar elliptical coils 42A, 42B. The local station 4, does not include a local alarm, but the alarm condition for EAS tags detected in the interrogation zone monitored by this station, is sounded by remote alarm 71 controlled directly by the central control station.

The third local station 5 has an associated transmitter assembly 51 comprising planar, rectangular nested coils 51A, 51B. An associated receiver assembly 52 comprises selectively connectable elliptical receiver coils 52A, 52B, 52C and 52D. The local station 5 further includes a control block 53 having a microcomputer 53A.

An alarm unit 54 is connected to the microcomputer 53A and is caused to be sounded based on EAS tags being detected in the interrogation zone being monitored by the local station. The microcomputer 53A and associated electronics 53B additionally provide selective phase interconnection of the receiver antenna assembly coils, gain adjustment of the received signals from these coils and selective output of the receiver coil signals.

The fourth local station 6 has control electronics 63, an associated receiver coil assembly 61 comprised of planar rectangular coils 61A, 61B, and an associated transmitter coil assembly 62 comprised of a rectangular coil 62A. The transmitter coil 62A surrounds the receiver coils 61A, 61B. The alarm condition for the local station 6 is also provided by the remote alarm 71 based on the detection of EAS tags in the interrogation zone being monitored by the local station.

In accordance with the principles of the present invention, the central station 2 is adapted to simultaneously interface with, to establish EAS tag determinations and alarm conditions for and to provide primary control of each of the different personality local stations 3–6. To this end, the central station is provided with input/output ports 2A–2D which couple with communication paths 7A–7B connecting the central station with the respective local stations 3–6.

The central station 2 further comprises a central processing unit 2E, hardware equipment 2F and software programming 2G which together enable appropriate signals to be received from and applied to input/output ports 2A–2D. Specifically, the hardware equipment 2F and software programming 2G have different parts, diagrammatically illustrated as respective parts $2F_1$, $2F_2$, $2F_3$ and $2F_4$ and $2G_1$, $2G_2$, $2G_3$ and $2G_4$, associated with the different personality local stations 3–6. These parts can be selectively accessed by the central processing unit 2E to effect communication between an input/output port and its particular local station for control of the local station.

It should be noted that while illustrated as distinct parts in FIG. 1, the hardware parts $2F_1$–$2F_4$ and the software parts $2G_1$–$2G_4$, may overlap and comprise substantially the same hardware and the same software, as long as there is a difference in at least one respect. This difference may be merely a difference in adjustments and/or parameters used for common hardware and/or common software. It may also be a difference in communication protocols, a difference in the EAS tag determination and alarm condition algorithms and/or a difference in the alarming function provided by software and/or hardware. Any such difference or other difference in any respect will constitute the resultant hardware to be a different part of the hardware 2F and the resultant software to be a different part of the software 2G.

As above indicated, the central station 2, when communicating with and providing control of a particular local station, utilizes the parts of its hardware 2F and parts of its software programming 2G, associated with this local station to effect the communication and control. The central station 2 can thus address the different personality local stations and carry out the necessary control operations, including the adjustments of the hardware and software parameter values based on noise conditions, to effect EAS tag determinations and alarm signal generations in accordance with the personality of that station.

The central station 2 is highly adaptable to locations having diverse types of areas to be monitored. Thus, the central station 2 can be used to provide common control of entrance door areas, exit door areas, point-of-sale areas and loading areas of a location. These areas might typically utilize the local stations 3–6, respectively, to monitor for EAS tag presence. A more detailed description of a local station of the type depicted as local station 5 and its associated functioning and control requirements, can be found in U.S. patent application Ser. No. 08/551,958, entitled "EAS System Employing Central and Local Stations with Shared Functions" which is being filed concurrently herewith, (Nov. 2, 1996) the teachings of which are incorporated herein by reference. Local stations of the type depicted as stations 3, 4 and 6 are embodied in equipment manufactured by Sensormatic Electronics Corporation under the product names Euro*Pro, Pro*Max and Floor*Max, respectively.

As can be appreciated with the central station 2, once the nature of the personalities of the local stations 3–6 is provided to the central processing unit 2A of the central station, the central processing unit will use the parts of the hardware 2E and software 2F associated with that type of personality station when controlling that station. The appropriate communication protocol will thus be used, as well as other appropriate processing and signaling criteria. Communication with the local stations will thus occur automatically and efficiently.

Figure 2:
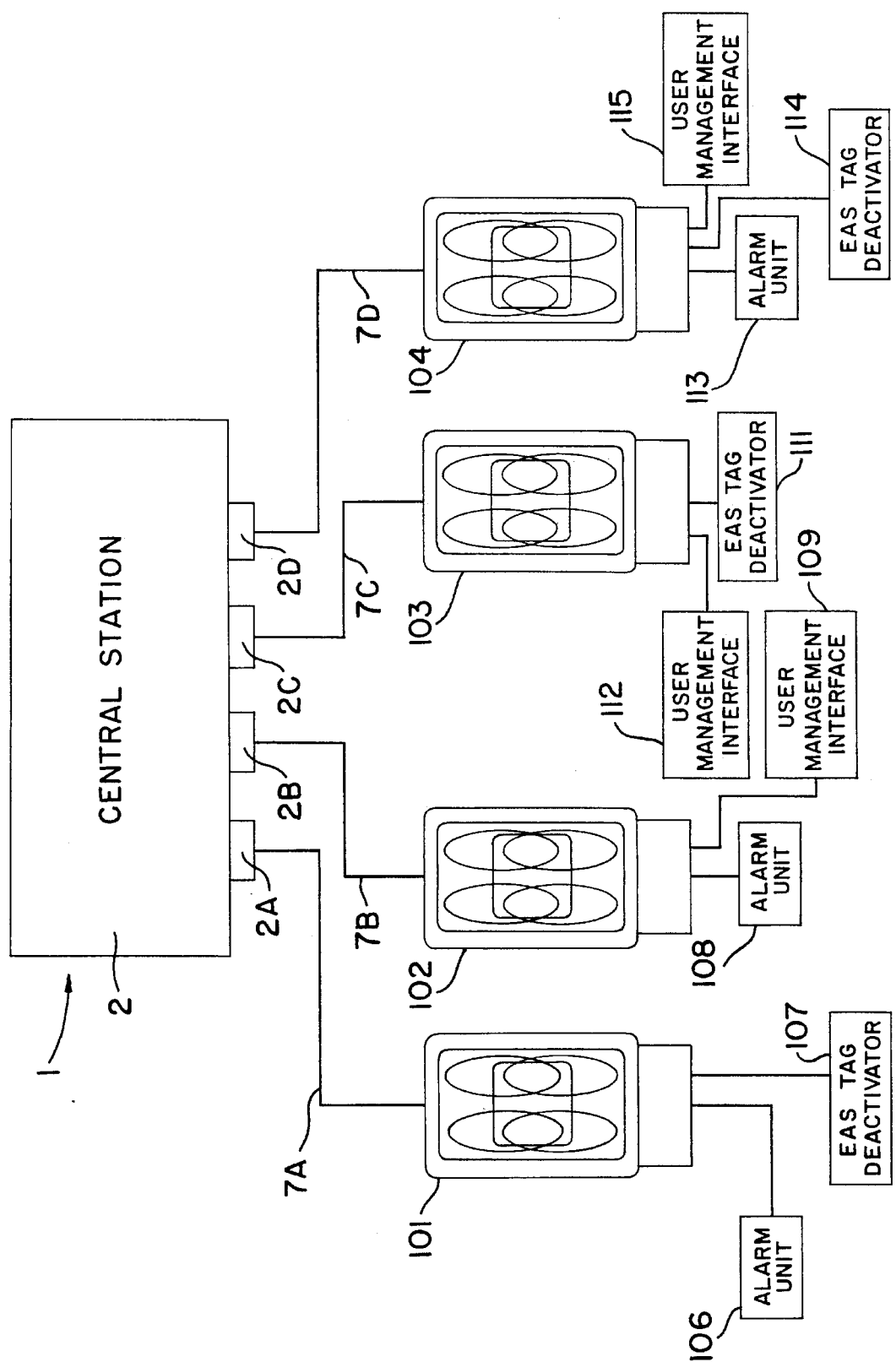
FIGS. 2–3 are block diagrams of modified versions of the EAS system and central control station of FIG. 1.
Figure 3:
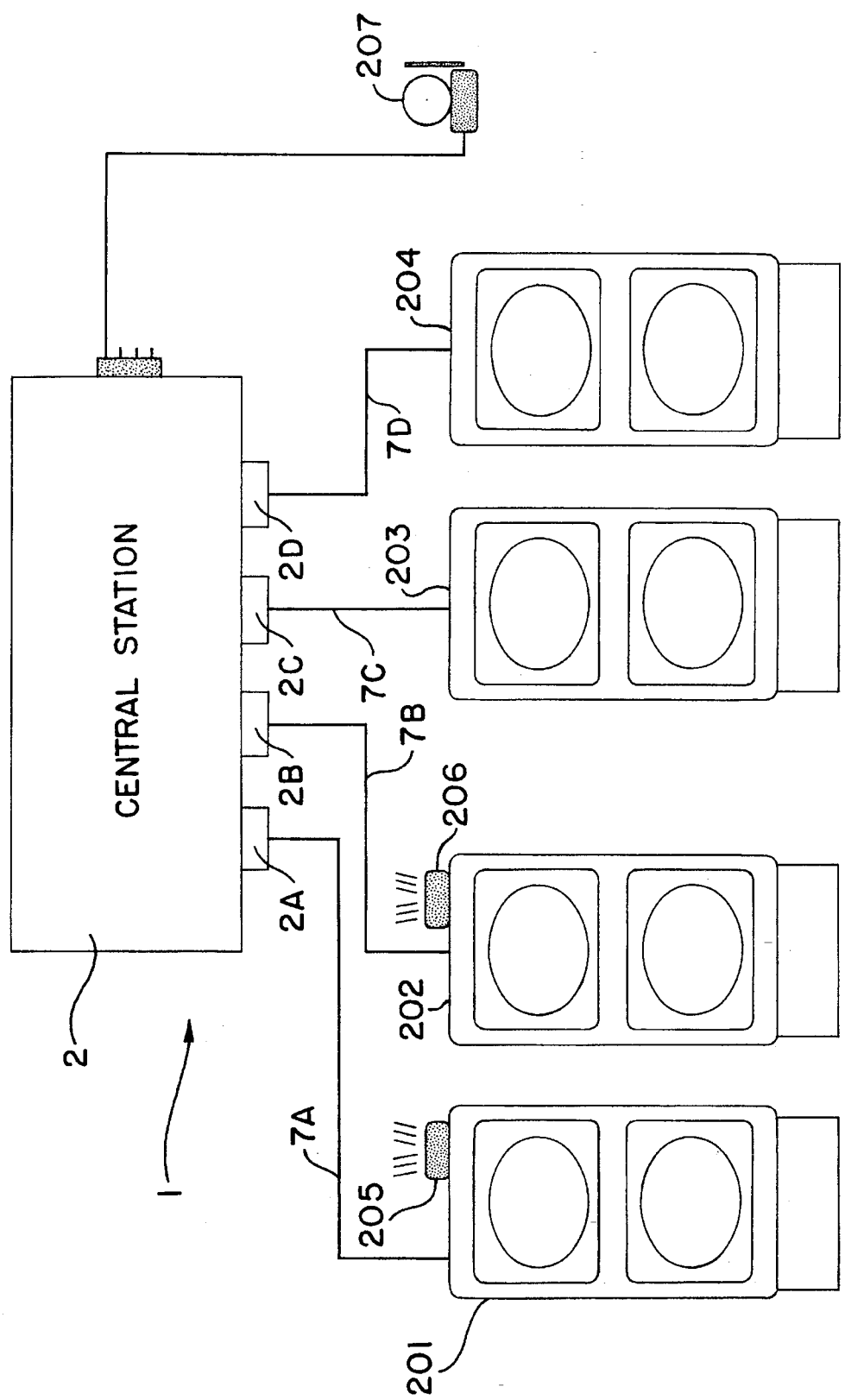

FIGS. 2–3 show various other groupings of local stations connected to the central station 2. In FIG. 2, the local stations 101–104 are like the local station 5 of FIG. 1, except that they provide control over different auxiliary components. Station 101 provides control of an alarm 106 and an EAS tag deactivator 107. Station 102 provides control of an alarm 108 and a user management interface 109. Station 103 provides control over an EAS tag deactivator 111 and a user management interface 112. Finally, station 104 provides control over an alarm 113, an EAS tag deactivator 114 and user management interface 115.

In FIG. 3, the local stations 201 and 202 are like the station 3 of FIG. 1 in that each includes or provides control over a local alarm 205, 206 as in FIG. 1. The stations 203 and 204 are, in turn, like the station 4 of FIG. 1, and do not include a local alarm. The alarming for these stations is provided by remote alarm 207 which is controlled directly by the central station 2.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention. Thus, for example, one or more of the other local stations 3, 4 and 6 in the EAS system 1 of FIG. 1 can include a microcomputer so as to be an active or intelligent station like the station 5, instead of merely a passive station.

What is claimed is:

1. A central control station for use with different personality local stations in an electronic article surveillance system comprising:

one or more ports each adapted to interface with a local station;

hardware equipment and software programming having different parts associated with controlling different personality local stations; and a central processing unit for coordinating operation of said hardware equipment and software programming such that a given local station interfaced with a given one of said one or more ports is controlled based on the parts of the hardware equipment and software programming associated with that given local station.

2. A central control station in accordance with claim 1 wherein:

said different personality local stations include one or more of: a local station associated with transmitter and receiver antenna assemblies adapted to be mounted in the floor of a location or suspended overhead in a location; a local station associated with transmitter and receiver antenna assemblies adapted to be mounted adjacent an exit of a location; a local station associated with transmitter and receiver antenna assemblies adapted to be mounted adjacent an entrance of a location; and a local station associated with transmitter and receiver antenna assemblies adapted to be mounted adjacent to a point-of-sale area of a location.

3. A central control station in accordance with claim 1 wherein:

the personality of a local station includes one or more of the following: the receiver antenna assembly associated with the local station; the transmitter antenna assembly associated with the local station; the communication protocol associated with the local station; the gain adjustment with respect to noise for received signals of the local station; the phase connection of the receiver coils of the receiver assembly with respect to noise of the local station; the alarming at the local station; the control of accessory equipment at the local station.

4. A central control station in accordance with claim 1 wherein:

a first of the one or more different personality local stations includes an alarm.

5. A central control station in accordance with claim 1 wherein:

a first of said one or more different personality local stations includes a microcomputer.

6. A central control station in accordance with claim 5 wherein:

said first local station provides control of one or more of: an alarm; an EAS tag deactivator; a user management interface; circuitry for controlling the gain of signals received at that local station; circuitry for selective outputting of signals received at that local station; and circuitry for phasing the connection of the receiver antenna coils at that local station.

7. An EAS system in accordance with claim 1 wherein:

said one or more local stations include first and second different personality local stations.

8. An EAS system in accordance with claim 7 wherein:

said one or more local stations further include third and fourth different personality local stations.

9. An EAS system in accordance with claim 8 wherein:

said different personality local stations include one or more of: a local station associated with transmitter and receiver antenna assemblies adapted to be mounted in the floor of a location or suspended overhead in a location; a local station associated with transmitter and receiver antenna assemblies adapted to be mounted adjacent an exit of a location; a local station associated with transmitter and receiver antenna assemblies adapted to be mounted adjacent an entrance of a location; and a local station associated with transmitter and receiver antenna assemblies adapted to be mounted adjacent to a point-of-sale area of a location.

10. An EAS system comprising:

one or more different personality local stations, each local station having associated therewith a transmitter antenna assembly for transmitting signals into an interrogation zone and a receiver antenna assembly for receiving signals from the interrogation zone;

and a central control station for controlling said one or more local stations, said central control station comprising: one or more ports each adapted to interface with a local station; hardware equipment and software programming having different parts associated with controlling different personality local stations; and a central processing unit for coordinating the operation of said hardware equipment and software programming such that a given local station interfaced with a given one of said one or more ports is controlled based on the parts of the hardware equipment and software programming associated with that given local station.

11. An EAS system in accordance with claim 10 wherein:

said different personality local stations include one or more of: a local station associated with transmitter and receiver antenna assemblies adapted to be mounted in the floor of a location or suspended overhead in a location; a local station associated with transmitter and receiver antenna assemblies adapted to be mounted adjacent an exit of a location; a local station associated with transmitter and receiver antenna assemblies adapted to be mounted adjacent an entrance of a location; and a local station associated with transmitter and receiver antenna assemblies adapted to be mounted adjacent to a point-of-sale area of a location.

12. An EAS system in accordance with claim 10 wherein:

the personality of a local station includes one or more of the following: the receiver antenna assembly associated with the local station; the transmitter antenna assembly associated with the local station; the communication protocol associated with the local station; the gain adjustment with respect to noise for received signals of the local station; the phase connection of the receiver coils of the receiver assembly with respect to noise of the local station; the alarming at the local station; the control of accessory equipment at the local station.

13. An EAS system in accordance with claim 10 wherein:

a first of the one or more different personality local stations includes an alarm.

14. An EAS system in accordance with claim 10 wherein:

a first of said one or more different personality local stations includes a microcomputer.

15. An EAS system in accordance with claim 14 wherein:

said first local station provides control of one or more of: an alarm; an EAS tag deactivator; a user management interface; circuitry for controlling the gain of signals received at that local station; circuitry for selective outputting of signals received at that local station; and circuitry for phasing the connection of the receiver antenna coils at that local station.

* * * * *